(12) United States Patent
Koebler

(10) Patent No.: US 11,598,306 B2
(45) Date of Patent: Mar. 7, 2023

(54) EMERGENCY START

(71) Applicant: Martin Koebler, Davidson, NC (US)

(72) Inventor: Martin Koebler, Davidson, NC (US)

( * ) Notice: Subject to any disclaimer, the term of this patent is extended or adjusted under 35 U.S.C. 154(b) by 0 days.

(21) Appl. No.: 17/236,261

(22) Filed: Apr. 21, 2021

(65) Prior Publication Data

US 2021/0239084 A1 Aug. 5, 2021

Related U.S. Application Data

(63) Continuation-in-part of application No. 17/151,863, filed on Jan. 19, 2021.

(60) Provisional application No. 62/962,807, filed on Jan. 17, 2020.

(51) Int. Cl.
*F02N 11/08* (2006.01)
*H04B 7/26* (2006.01)

(52) U.S. Cl.
CPC ...... *F02N 11/0862* (2013.01); *F02N 11/0807* (2013.01); *H04B 7/26* (2013.01)

(58) Field of Classification Search
CPC ............. F02N 11/0807; F02N 11/0862; F02N 11/0866; F02N 2300/304; B60Q 9/00; H04W 4/80
USPC ............................................ 123/179.2, 179.3
See application file for complete search history.

(56) References Cited

U.S. PATENT DOCUMENTS

| | | | | |
|---|---|---|---|---|
| 5,793,185 A | * | 8/1998 | Prelec | H02J 7/0042 320/104 |
| 5,955,866 A | * | 9/1999 | Peng | H02J 7/342 320/105 |
| 5,982,138 A | * | 11/1999 | Krieger | H02J 7/0042 320/105 |
| D495,993 S | * | 9/2004 | Krieger | D13/107 |
| 7,134,415 B2 | * | 11/2006 | Burke | F02N 11/0866 123/179.3 |
| 9,579,990 B2 | * | 2/2017 | Butler | B60L 53/22 |
| 9,871,392 B2 | * | 1/2018 | Durando | H02J 9/04 |
| 10,174,736 B2 | * | 1/2019 | Zhang | F02N 11/14 |
| 10,400,732 B2 | * | 9/2019 | Harvey | H01M 50/20 |
| 10,446,885 B2 | * | 10/2019 | Clarke | H02J 7/00032 |
| D881,811 S | * | 4/2020 | Koebler | D13/119 |
| 10,697,417 B2 | * | 6/2020 | Koenen | H01M 10/425 |
| 11,136,956 B2 | * | 10/2021 | Gilpatrick | F02N 11/0862 |
| D938,441 S | * | 12/2021 | Nook | D14/485 |
| 2009/0056661 A1 | * | 3/2009 | Cook | F02N 11/0866 123/179.3 |
| 2013/0213336 A1 | * | 8/2013 | Solberg | F02N 11/0866 123/179.3 |
| 2014/0375067 A1 | * | 12/2014 | Yang | H02J 1/108 290/38 R |

(Continued)

*Primary Examiner* — John Kwon
*Assistant Examiner* — Arnold Castro
(74) *Attorney, Agent, or Firm* — Thomas M. Joseph, Esq

(57) ABSTRACT

A battery pack has a battery connection assembly for connecting to an electric motor with at least one lithium-based rechargeable cell therein and associated means for turning the at least one lithium-based rechargeable cell ON or OFF. The battery pack is configured to store a reserve within the at least one lithium-based rechargeable cell that is sufficient to start the engine electric motor. The battery pack can be activated by the associated means for turning the at least one lithium-based rechargeable cell ON or OFF to access the reserve to start the engine electric motor.

19 Claims, 9 Drawing Sheets

(56) References Cited

U.S. PATENT DOCUMENTS

| | | | | |
|---|---|---|---|---|
| 2015/0345459 A1* | 12/2015 | Koenen | ............... | H02J 7/0013 |
| | | | | 123/179.28 |
| 2016/0185225 A1* | 6/2016 | Namuduri | ........... | B60L 15/2054 |
| | | | | 701/22 |
| 2016/0268645 A1* | 9/2016 | Koebler | ............... | H01M 50/20 |
| 2016/0285258 A1* | 9/2016 | Wu | ..................... | H02H 11/005 |
| 2016/0288651 A1* | 10/2016 | Kinoshita | ............... | B60L 58/20 |
| 2016/0288652 A1* | 10/2016 | Suzuki | ............... | F02N 11/0866 |
| 2016/0290305 A1* | 10/2016 | Kinoshita | ........... | F02N 11/0866 |
| 2017/0110766 A1* | 4/2017 | Koebler | ............ | H01M 10/0525 |
| 2017/0317492 A1* | 11/2017 | Koebler | ................ | H01R 11/24 |
| 2018/0072300 A1* | 3/2018 | Jang | ........................ | H02J 7/34 |
| 2018/0269703 A1* | 9/2018 | Nook | ................. | H01M 50/543 |
| 2018/0351383 A1* | 12/2018 | Zeiler | ................... | H02J 7/1461 |
| 2019/0184971 A1* | 6/2019 | Kim | ........................ | F02N 15/006 |
| 2019/0198833 A1* | 6/2019 | Le | .......................... | B60L 58/12 |
| 2020/0028368 A1* | 1/2020 | Nook | ................... | H02J 7/0021 |
| 2020/0072177 A1* | 3/2020 | Clarke | ................... | B60L 53/62 |
| 2020/0086732 A1* | 3/2020 | Bargman | ................ | B60K 6/48 |
| 2020/0169114 A1* | 5/2020 | Almeida | ................ | B60R 16/04 |
| 2021/0239084 A1* | 8/2021 | Koebler | ............. | F02N 11/0807 |
| 2021/0313824 A1* | 10/2021 | Miyabe | ................ | H01M 10/44 |

* cited by examiner

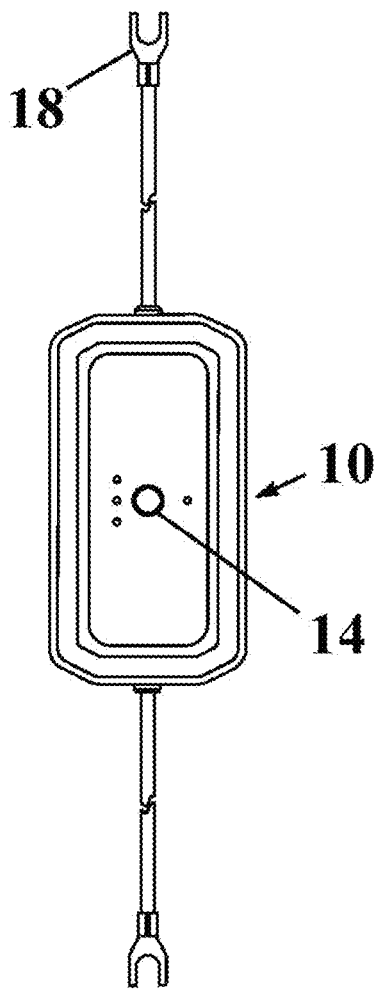  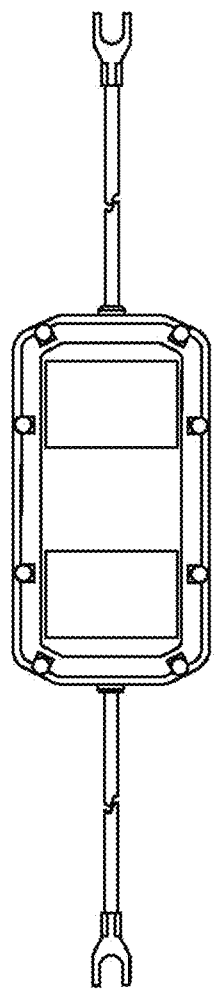
*FIG. 4*     *FIG. 5*     *FIG. 6*
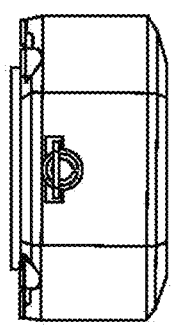
*FIG. 7*

 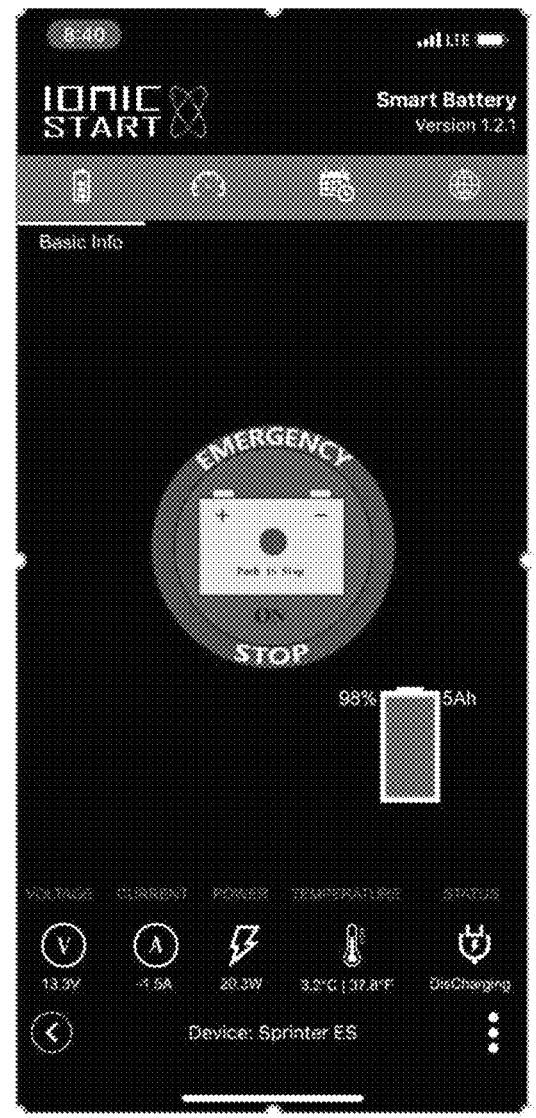
*FIG. 8*        *FIG. 9*

EMERGENCY START

CROSS REFERENCE TO RELATED APPLICATIONS

The present application is a continuation-in-part of U.S. patent application Ser. No. 17/151,863 entitled "EMERGENCY START" filed Jan. 19, 2021, which claims the benefit under 35 U.S.C. § 119(e) of U.S. Provisional Application No. 62/962,807 entitled "EMERGENCY START" filed Jan. 17, 2020, which is incorporated herein by reference.

BACKGROUND

At times, a motor vehicle powered by an internal combustion engine will have a dead battery preventing normal starting of the engine. This can leave the driver/pilot and the passengers in a dangerous situation, such as outside in the wind, rain, snow and cold, or, at the very least, greatly inconvenienced by the inability to move the vehicle.

Dead batteries present a problem for all types of motor vehicles. Accordingly, there is a need for an improved device that is capable of jump starting a wide variety of vehicles, including cars, trucks, SUVs and boats. This is especially true for vehicles having engine sizes up to 7.2 L (gas) and 4.0 L (diesel); as well as power sport vehicles, 4-cylinders, V6, V8 and V10 engines.

Vehicle and boat engine batteries are heavy, bulky, and have short cycle life, short calendar life, and low turn around efficiency. Ordinary lead-acid batteries also have a high internal impedance (resistance) that is greater in cold weather making it more difficult to start an IC engine in cold weather with less current available.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

In various implementations, a system for starting an engine electric motor is provided. A battery pack has a battery connection assembly for connecting to the electric motor with at least one lithium-based rechargeable cell therein and associated means for turning the at least one lithium-based rechargeable cell ON or OFF. The battery pack is configured to store a reserve within the at least one lithium-based rechargeable cell that is sufficient to start the engine electric motor. The battery pack can be activated by the associated means for turning the at least one lithium-based rechargeable cell ON or OFF to access the reserve to start the engine electric motor.

In other implementations, a method for starting an engine electric motor is provided. A battery pack having at least one lithium-based rechargeable cell therein and associated means for turning the at least one lithium-based rechargeable cell ON or OFF is configured to store a reserve within the at least one lithium-based rechargeable cell that is sufficient to start the engine electric motor. The battery back is connected to the engine electric motor. The battery pack is activated with the associated means for turning the at least one lithium-based rechargeable cell ON or OFF to access the reserve to start the engine electric motor.

These and other features and advantages will be apparent from a reading of the following detailed description and a review of the appended drawings. It is to be understood that the foregoing summary, the following detailed description and the appended drawings are explanatory only and are not restrictive of various aspects as claimed.

BRIEF DESCRIPTION OF THE DRAWINGS

FIGS. 3 and 4 are front views of the invented emergency start apparatus.

FIG. 5 is a left side view of the invented emergency start apparatus, the right side view being a mirror image thereof.

FIG. 6 is a rear view of the invented emergency start apparatus.

FIG. 7 is a top end view of the invented emergency start apparatus, the bottom end view being the same.

FIG. 8 is a detailed top view of the invented emergency start device controls utilizing an APP with a display showing the device in the OFF mode.

FIG. 9 is a detailed top view of the invented emergency start device controls utilizing an APP with a display showing the device in the ON mode.

DETAILED DESCRIPTION

Figure 1:
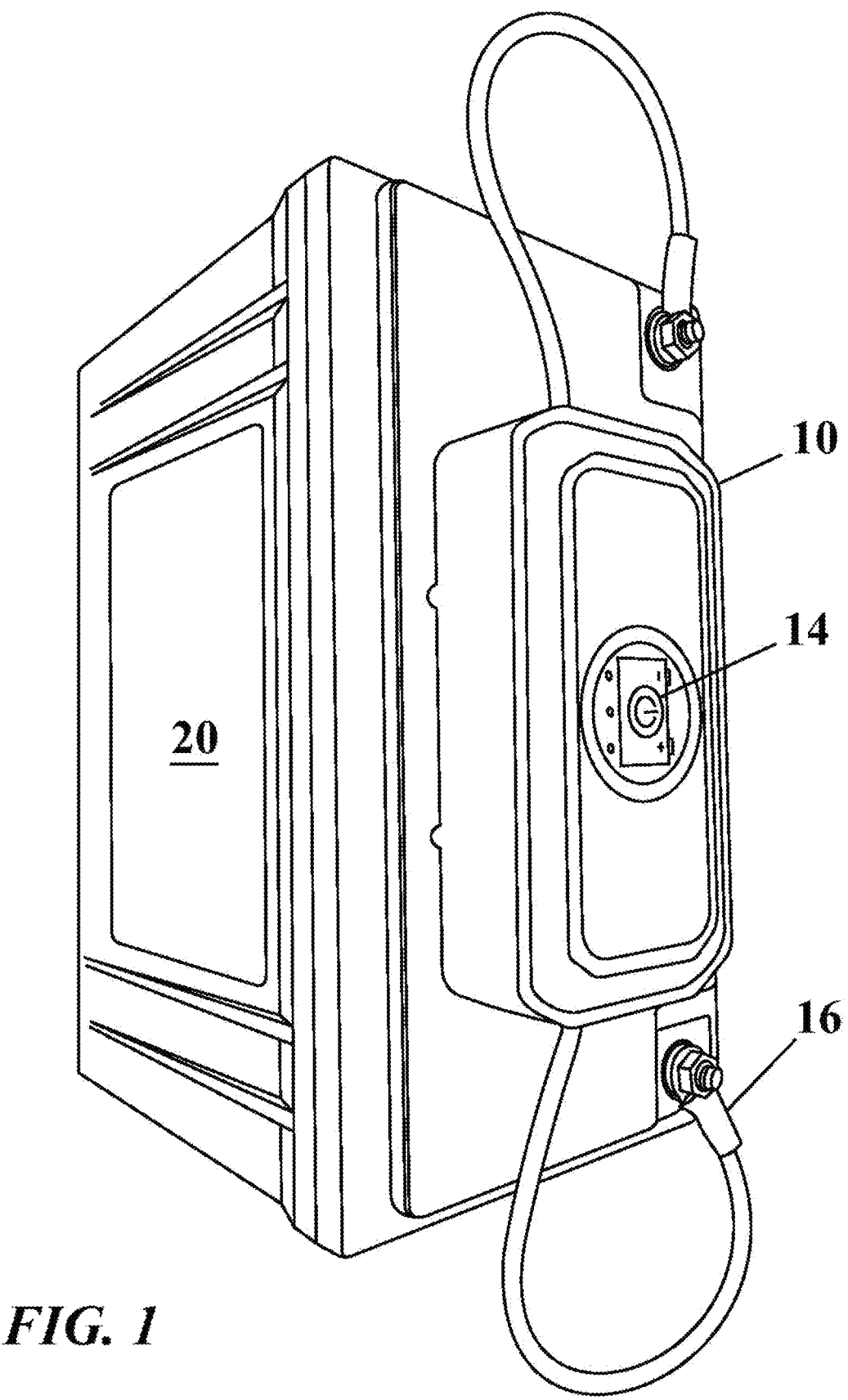
FIG. 1 is an isometric view of the invented emergency start apparatus mounted on a 12 v battery.
Figure 2:
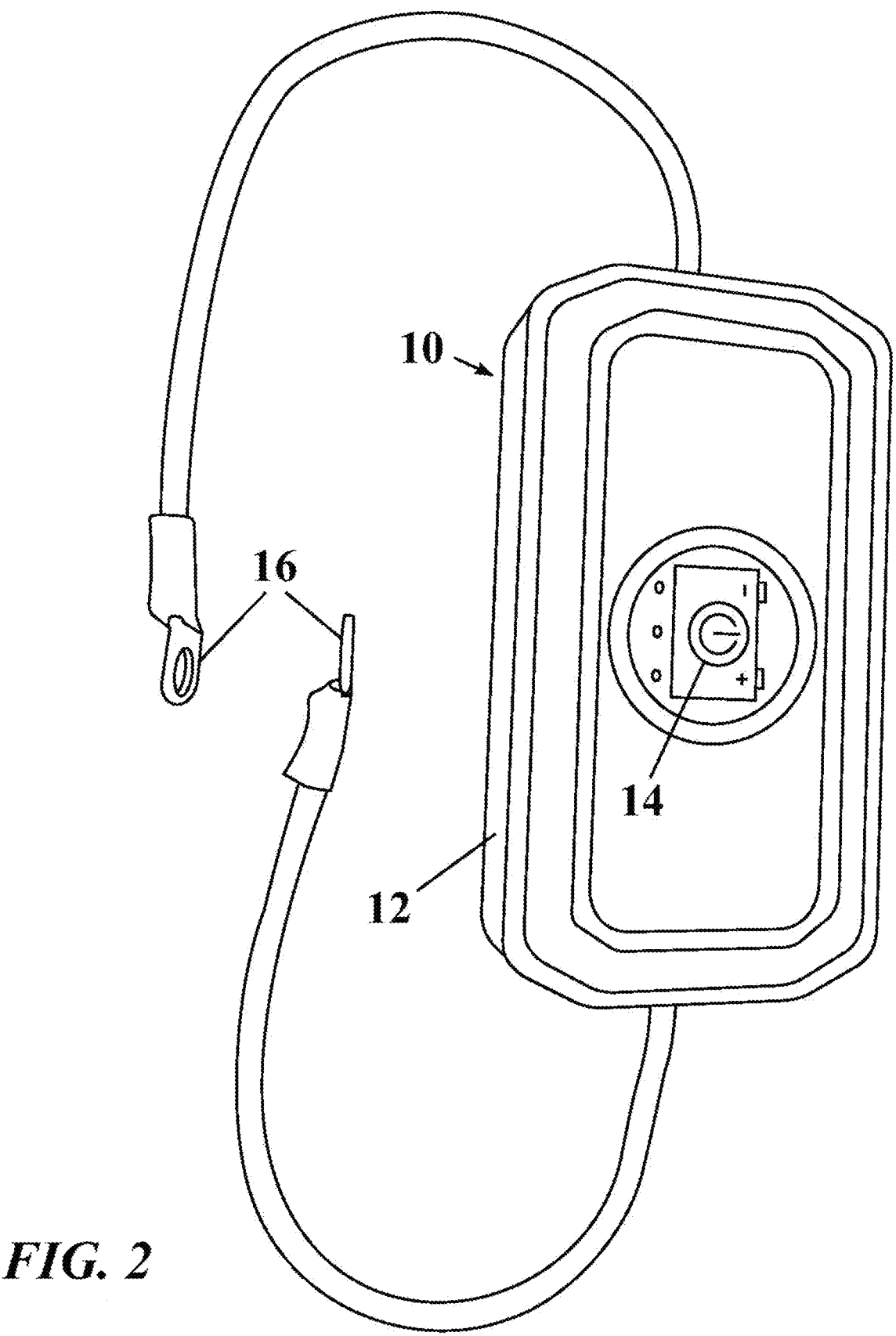
FIG. 2 is an isometric view of the invented emergency start apparatus.

The subject disclosure is directed an improved emergency start apparatus. The improved emergency start can jumpstart the main battery in an emergency. The emergency start can be activated by long press or by an app residing on a computing device.

The detailed description provided below in connection with the appended drawings is intended as a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

References to "one embodiment," "an embodiment," "an example embodiment," "one implementation," "an implementation," "one example," "an example" and the like, indicate that the described embodiment, implementation or example can include a particular feature, structure or characteristic, but every embodiment, implementation or example can not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

Numerous specific details are set forth in order to provide a thorough understanding of one or more embodiments of the described subject matter. It is to be appreciated, however, that such embodiments can be practiced without these specific details.

Various features of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

The disclosed subject matter can be implemented, at least partially, as a system, a method, and/or a computer program product at any possible technical detail level of integration. The computer program product can include a computer readable storage medium (or media) having computer readable program instructions thereon for causing a processor to carry out embodiments and features of the subject disclosure.

The system, method, and/or computer program can be implemented with mobile devices and smartphones, as well as other types of computer systems and/or computing devices, such as handheld computers, tablets, smart watches, PCs, desktops, workstations, or any other similar device.

Referring to the drawings and, in particular, to FIGS. 1-9, there is shown an emergency start auxiliary battery pack unit 10, generally designated by the numeral 10. The auxiliary battery pack unit 10 can provide power to an electric motor for starting an internal combustion engine in which the electric motor is in a 6 volt to 48 volt operating system, comprises a battery pack housing 12, at least one lithium-based rechargeable cell within the housing, means incorporated within the housing for receiving a signal to turn the cell ON or OFF, associated means such as ON-OFF button 14 for turning the rechargeable cell ON or OFF, and battery connections 16 for connecting the auxiliary battery pack 10 to a battery 20 in a 6 volt to 48 volt operating system. The battery pack unit can be provided with associated means for receiving a radio transmitted signal for operating the battery pack. The ON-OFF button can be operated manually, but preferably, it is operated by a smartphone, using Bluetooth® technology.

The auxiliary battery pack 10 provides several advantages, such as the use of Bluetooth® technology and a specialized smartphone app provide the ability to jumpstart a car without ever leaving the safety of the driver's seat. Bluetooth® connections can be accomplished through a short-wavelength UHF radio signal in the ISM band from 2.4 to 2.485 GHz (i.e., a Bluetooth® signal or a Bluetooth® Low Energy signal), or through any other similar wireless connection. Bluetooth® is a registered trademark of Bluetooth Sig, Inc. of Kirkland, Wash.

The unit 10 is usable on automobiles, trucks, sport utility vehicles (SUVs), all-terrain vehicles (ATVs), boats and other items having battery-started engines. Other advantages of the unit 10 include the use of a user friendly smartphone app in some embodiments. Additionally, the unit 10 provides the user with the safety of not being stranded with a dead battery anywhere.

The unit 10 can be charged by the vehicle charging system in which it is installed. The unit 10 can include an auto-detect disconnect from the vehicle drain. The unit 10 works on engines up to 7.2 L V8 and small diesels (4.0 MAX). The unit 10 may be permanently mounted on the vehicle's starter battery. Further, the unit 10 is easy to remove to and install on another vehicle, if desired.

The unit 10 can stay fully charged and can be ready to assist the battery whenever needed. The unit allows the user to jumpstart his vehicle manually by pressing the "Start button" or by Bluetooth® operation from a smartphone. The unit 10 is provided with a waterproof exterior housing or case 12.

Figure 3:
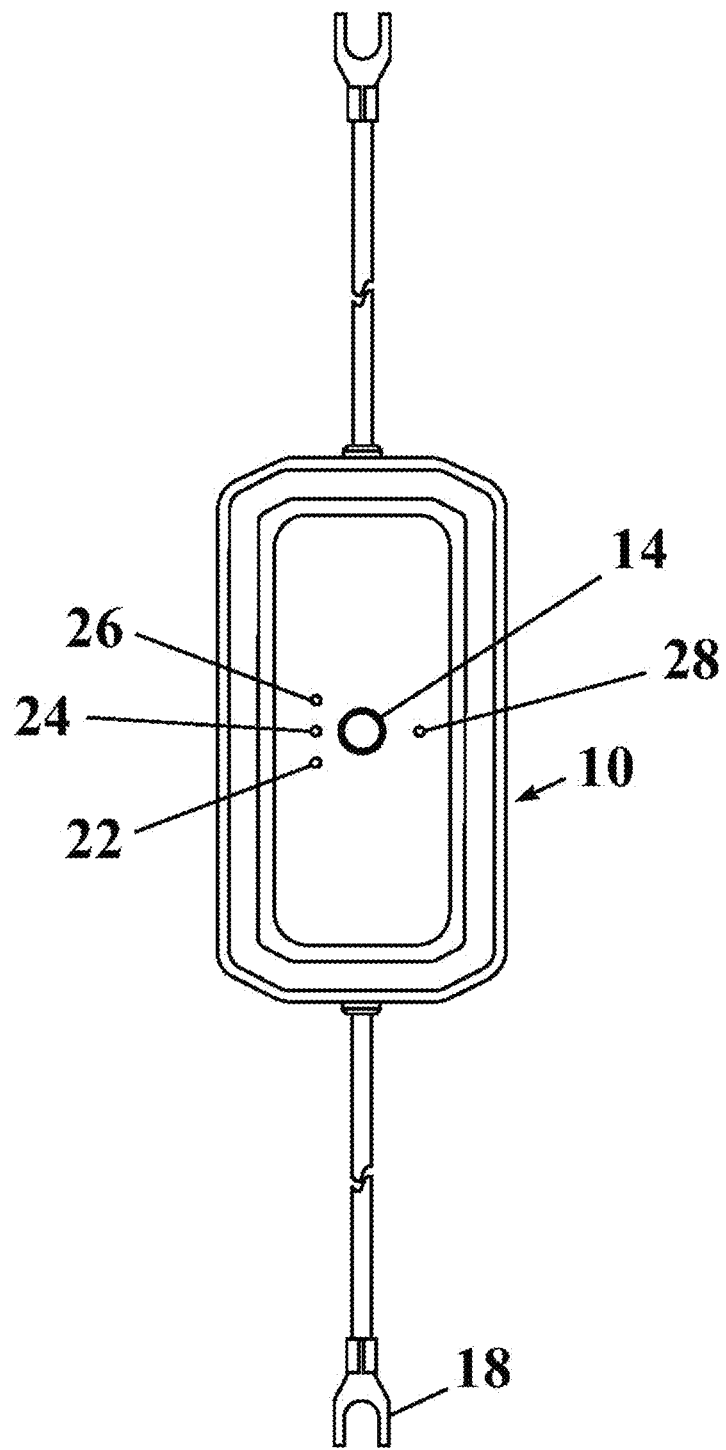

Referring now to FIGS. 3, 8, and 9, the unit 10 includes a function button 14, ring terminals 16, spade connectors 18, Bluetooth® Status LED lights 22-26, and indicator light 28. The function button 14 includes short press that displays Battery Level as shown in FIGS. 8 and 9 with the pong press activating the "START".

The Bluetooth® Status LED lights 22-26 indicate the battery level. If the battery level LED 22 is lit to indicate "Low". If the battery level LED 24 is lit to indicate "Medium". If the battery level LED 26 is lit to indicate "Full". The indicator light 28 can indicate Bluetooth® usage by turning blue and can indicate that there is an error in the system by turning red.

The battery connections are permanent ring terminals 16, spade connectors 18, or other firm connectors, but not clamps.

The unit 10 can be charged by a vehicle charging system. However, it may optionally be charged by a charger such as ionic 12V 4 A charger to charge the Emergency Start. Note that a full charge or recharge of the unit should take less than 30 minutes, depending the on vehicle charging system. It is recommended that the unit be charged every 6 months for optimum performance.

From an APP, the attached battery pack can be turned ON or OFF, monitor battery charge level, monitor battery voltage, monitor battery current, monitor power level, monitor temperature, monitor cycle life, monitor status (charging, discharging, standby), display error message for (High Voltage, Low Voltage, Over current Charging, Over current Discharging, Low Temperature charging, Low temperature discharging, High Temperature Charging, High Temperature Discharging.

The unit 10 can be activated either by long pressing the START button or with the "Ionic Red Batteries" APP. When activating by long pressing the START button, the LED lights on the Emergency Start will start blinking rapidly, indicating cables are active and ready to start the engine. When activating the Emergency Starter by the APP, the procedure is to open the APP, "Ionic Red Batteries", and press on the circular "Start" button. The circular button will turn green that will allow the operator to start your engine. The LED lights on the Emergency Start will start blinking rapidly, indicating cables are active and ready to start the engine.

The unit 10 can stay active until a discharge voltage of 13.6V is reached. When reactivating the unit again by repressing the circular button the Emergency Start will stay ON until the Emergency Start battery is fully discharged at ~10V. An engine start attempt can be made during any time when the unit is active.

Any time a charging system is charging, such as from vehicle alternator the unit 10 will turn ON to receive a charge.

The unit 10 can disconnect itself automatically from the vehicle battery system when the battery voltage drops below 13.6V, keeping the unit 10 at full charge and to prevent the unit 10 from discharging.

From APP, the attached unit 10 can be turned ON or OFF, monitor battery charge level, monitor battery voltage, monitor battery current, monitor power level, monitor temperature, monitor cycle life, monitor status (charging, discharging, standby), and display error message for High Voltage, Low Voltage, Over current Charging, Over current Discharging, Low Temperature charging, Low temperature discharging, High Temperature Charging, and High Temperature Discharging.

It should be noted that the unit 10 does not have to be connected directly to the vehicle battery. It can be connected to the vehicle 12V system used for starting engines, but otherwise works as described above.

Figure 10:
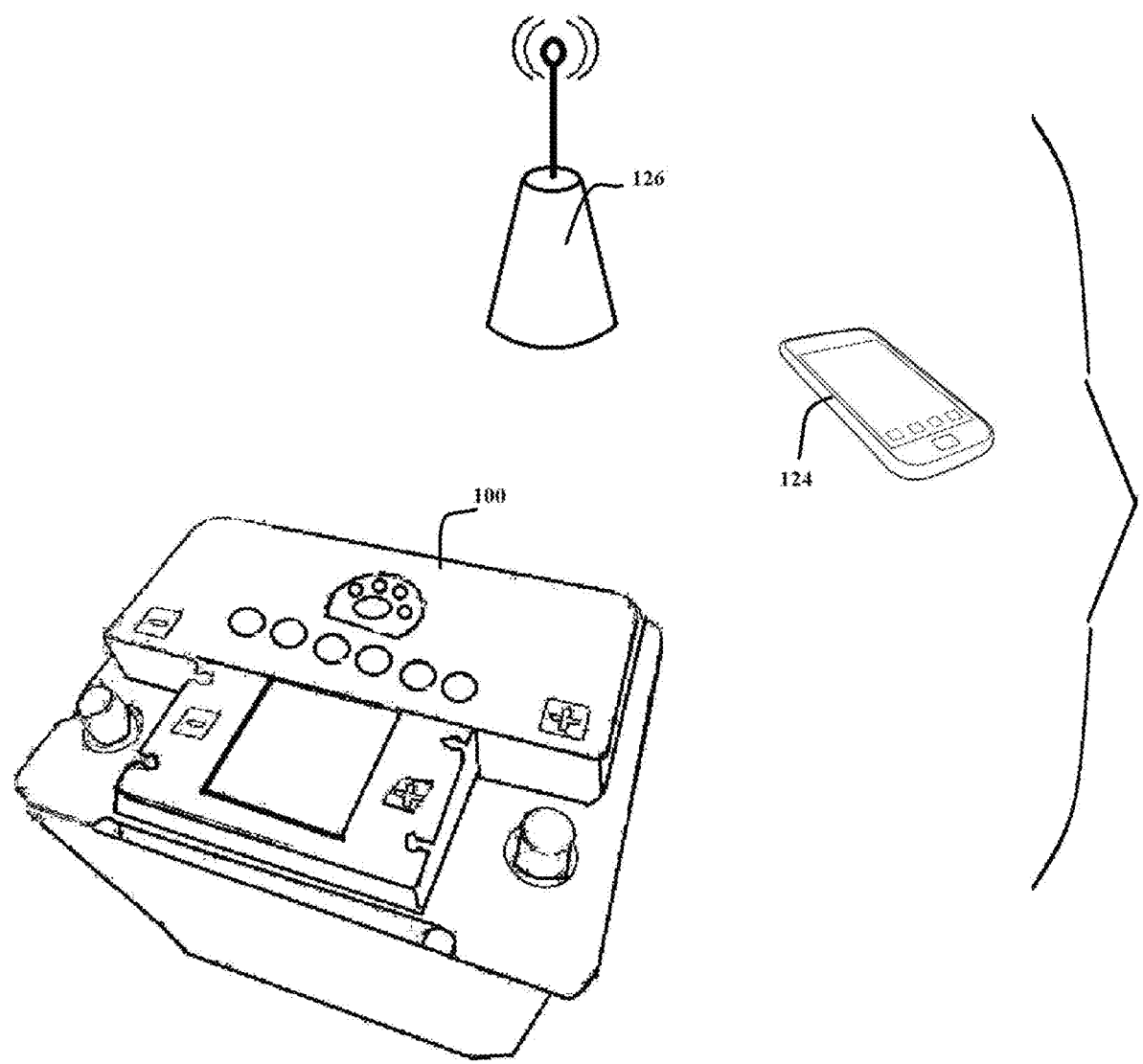
FIG. 10 is an isometric view of another embodiment of an emergency start device in accordance with the subject disclosure.
Figure 11:
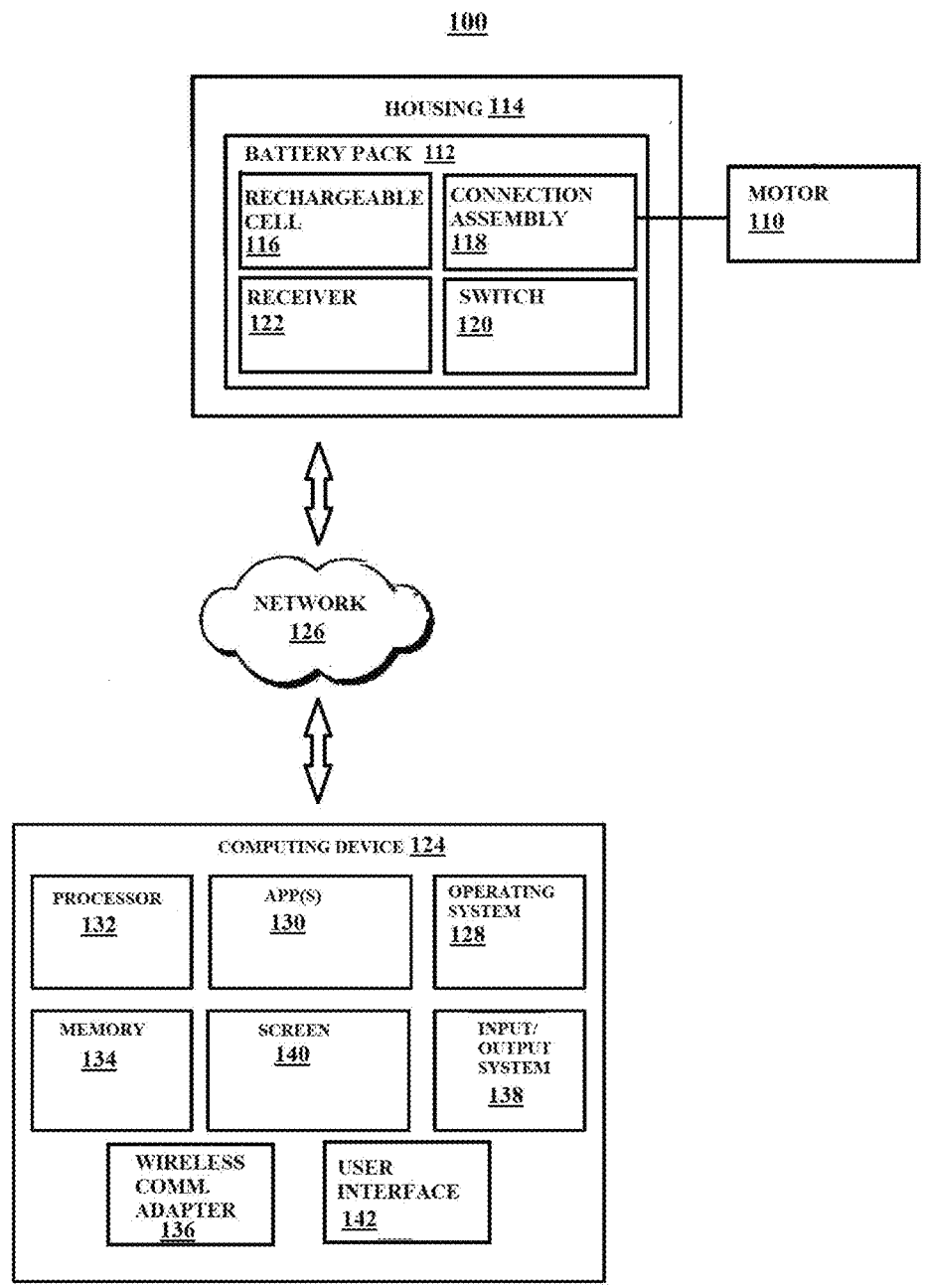
FIG. 11 is a schematic diagram of the emergency start device shown in FIG. 10.

Referring now to FIGS. 10-11, an improved system, generally designated by the numeral 100, for supplying power to start a motor 110 is shown. The system 100 includes a battery pack assembly 112 positioned within a housing 114. The battery pack 112 includes one or more rechargeable cells 116, a connection assembly 118, a switch 120, and a receiver 122. The connection assembly 118 can include ring terminals, spade connectors, or other similar connecting devices.

The one or more rechargeable cells 116 can include one or more lithium-based rechargeable cells. The switch 120 can be associated means for turning the one or more rechargeable cells 116 ON or OFF. The receiver 122 can be means for receiving a radio transmitted signal. In alternate embodiments, the associated means can be a transmitter, a transceiver, and/or a wireless communication adapter.

The battery pack 112 can be configured to implement an auto-detect restart feature (i.e., "IQ Restart technology") that protects the battery from a deep cycle discharge by monitoring battery voltage level and shutting the battery power off prior to a full discharge, such as in the case of leaving a headlight or electrical component on for an extended period of time while the engine is off.

Enough reserve power is left in the battery, to automatically detect (by measuring a change in resistivity) a starting effort and allow the user to start the engine again. This avoids the operator from being stranded or the headache of replacing a battery. The auto-detect apparatus has at least one lithium-based cell, a voltage detector, an associated switch such as a cutoff board, or a micro-controller in a balancing circuit connected to a solid state switch, such as a field-effect transistor (FET).

One function turns off an FET in the circuit when the voltage drops to a preselected level, leaving sufficient reserve capacity for starting the engine. A second function detects a "keying cycle" or the resistance change upon attempting to start the engine, which turns on the FET. This resistance change is a reaction to a key turn, push button, or remote activator.

To control the solid state switches, electronic controls are needed for the different voltages, currents and/or temperature with specified parameters in which cells work to prevent damage. The control electronics used in battery systems are often referred to a Battery Management System (BMS) or Battery Management Unit (BMU). The BMS or BMU can individual monitor all the cell or battery voltages, and/or temperatures. To protect a single cell or battery from being over charged, that might lead to an exothermal runaway reaction creating a fire and/or to prevent the cell from damaging when discharging them too low, the solid state switch would close or open the current pathway to prevent cell damage from occurring.

The housing 114 can have a single, uniform or unitary body. Alternatively, the housing 114 can be made from integral pieces or separate pieces that are permanently or temporarily joined to one another. The housing 114 can be made from any suitable material through any suitable manufacturing method.

Suitable materials include flexible, rigid, or semi-rigid materials. Suitable materials also include metals, ceramics, plastics, and composites. It should be understood that each component of the housing 114 can be made of a material that is specifically suited for the individual structural tolerances. Any combination of material or a uniform application of a single material that results in an acceptably robust structure is suitable.

As shown in FIG. 10, the receiver 122 can connect to remote means in the form of a digital or analog device that can activate the restart feature on the battery pack 112. In this exemplary embodiment, the remote means is a computing device 124 that connects to the battery pack 112 over a network 126. The computing device 124 can be a stationary computing device, such as a PC, or a mobile computing device, such as a smartphone, a handheld computer, a smart watch, a tablet or any other mobile client device. In this exemplary embodiment, the computing device 124 is a mobile device or smartphone.

The computing device 124 can include operating system 128 and various types of software applications and/or apps 130. Additionally, the computing device 124 can include processor 132 for performing tasks such as signal coding, data processing, input/output processing, power control, and/or other functions, and memory 134 that can be used for storing data and/or code for running operating system 128 and/or the apps 130. Exemplary data can include web pages, text, images, sound files, video data, or other data to be sent to and/or received from a server (not shown).

The computing device 124 can include a wireless communication adapter 136 that includes a receiver, a transmitter, and/or a transceiver. The wireless communication adapter 136 can connect to one or more networks, including network 126. The wireless communication adapter 136 can facilitate Bluetooth® connections.

The computing device 124 also includes an input/output system 138 and a display device or screen 140 for communicating with one or more users. Additionally, the computing device 124 includes a user interface 142 in the form of a long press, a long tap, a button, or other similar device. The user interface 142 is configured to activate the restart feature on the battery pack 112.

The computing device 124 can communicate with the receiver 122 through any suitable communication protocol, network, and/or technology. The apps 130 can be configured to display the status of the connection between the computing device 124 and the receiver 122 visually. Exemplary protocols/networks/technology include Bluetooth® technology, wireless (Wifi) network technology, Global System for Mobile Communications (GSM) protocol, General Packet Radio Service (GPRS), Enhanced Data Rates for Global Evolution (EDGE) network, and Universal Mobile Telecommunications System/High Speed Packet Access (UMTS/HSPA) protocol.

In some embodiments, the computing device 124 can communicate with the receiver 126 with radio waves having frequencies that fall within the range of about 400 MHz and about 2100 MHz. In other embodiments, the computing device 124 can communicate with the receiver 122 using at least one of a wireless radio frequency signal, a packet oriented mobile data standard network, an EDGE communication protocol, and a high speed packet communication protocol.

Figure 12:
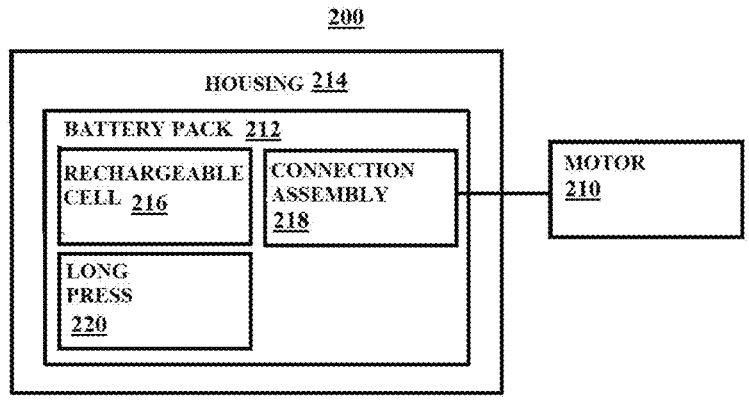
FIG. 12 is a schematic diagram of another embodiment of an emergency start device in accordance with the subject disclosure.

Referring now to FIG. 12, another embodiment of an improved system, generally designated by the numeral 200, for supplying power to start a motor 210 is shown. Like the embodiment shown in FIGS. 10-11, the system 200 includes a battery pack 212 that sits within a housing 214. The battery pack 212 includes a connection assembly 216 for connecting to the motor 210 and one or more rechargeable cells 218 that include a reserve for starting the motor 210.

Unlike the embodiment shown in FIGS. 10-11, the reserve within the one or more rechargeable cells 218 cannot be activated remotely. Instead, the reserve is activated with a long press 220 that can extend through the housing 214.

Exemplary Computing Architecture

Figure 13:
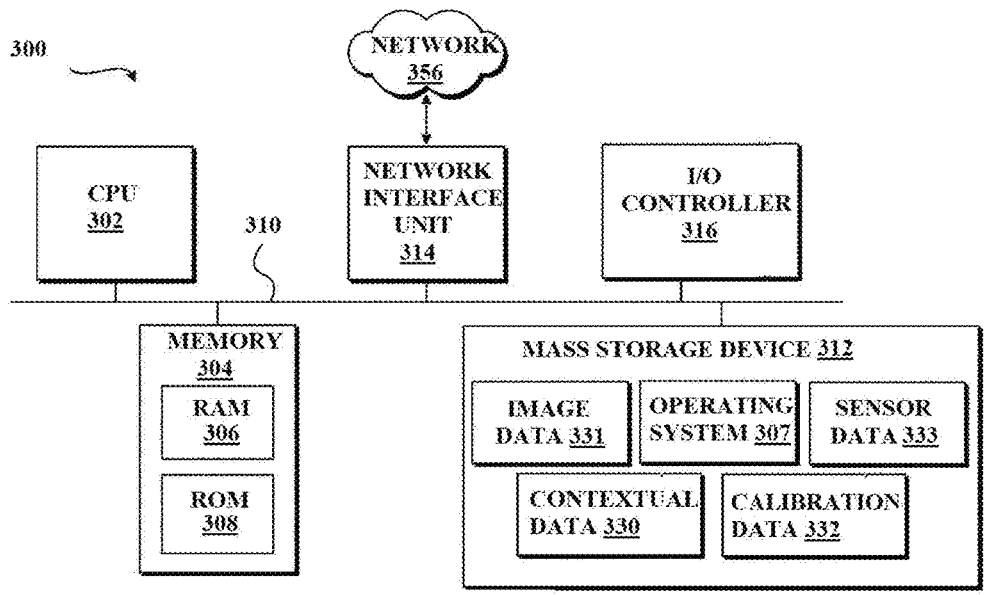
FIG. 13 is a computer architecture diagram illustrating an illustrative computer hardware and software architecture for a computing system in accordance with the subject disclosure.

Referring now to FIG. 13 with continuing reference to the foregoing figures, computer architecture, generally designated by the numeral 300, includes a central processing unit 302 ("CPU"), a system memory 304, including a random access memory 306 ("RAM") and a read-only memory ("ROM") 308, and a system bus 310 that couples the memory 304 to the CPU 302. A basic input/output system containing the basic routines that help to transfer information between elements within the computer architecture 300, such as during startup, is stored in the ROM 308. In this exemplary embodiment, the computing device 124 shown in FIGS. 10-11 can be implemented within the computer architecture 300.

The computer architecture 300 further includes a mass storage device 312 for storing an operating system 307, and one or more application programs including, but not limited to, a tracking module 105 and contextual data 330, image data 331, calibration data 332, and sensor data 333.

The mass storage device 312 is connected to the CPU 302 through a mass storage controller (not shown) connected to the bus 310. The mass storage device 312 and its associated computer-readable media provide non-volatile storage for the computer architecture 300. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 300.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media can include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 300. For purposes the claims, the phrase "computer storage medium," "computer-readable storage medium" and variations thereof, does not include waves, signals, and/or other transitory and/or intangible communication media, per se.

According to various configurations, the computer architecture 300 can operate in a networked environment using logical connections to remote computers through the network 356 and/or another network (not shown). The computer architecture 300 can connect to the network 356 through a network interface unit 314 connected to the bus 310. It should be appreciated that the network interface unit 314 also can be utilized to connect to other types of networks and remote computer systems. The computer architecture 300 also can include an input/output controller 316 for receiving and processing input from a number of other devices, including a keyboard, mouse, or electronic stylus (not shown in FIG. 13). Similarly, the input/output controller 316 can provide output to a display screen, a printer, or other type of output device (also not shown in FIG. 13).

It should be appreciated that the software components described herein can, when loaded into the CPU 302 and executed, transform the CPU 302 and the overall computer architecture 300 from a general-purpose computing system into a special-purpose computing system customized to facilitate the functionality presented herein. The CPU 302 can be constructed from any number of transistors or other discrete circuit elements, which can individually or collectively assume any number of states. More specifically, the CPU 302 can operate as a finite-state machine, in response to executable instructions contained within the software modules disclosed herein. These computer-executable instructions can transform the CPU 302 by specifying how the CPU 302 transitions between states, thereby transforming the transistors or other discrete hardware elements constituting the CPU 302.

Encoding the software modules presented herein also can transform the physical structure of the computer-readable media presented herein. The specific transformation of physical structure can depend on various factors, in different implementations of this description. Examples of such factors can include, but are not limited to, the technology used to implement the computer-readable media, whether the computer-readable media is characterized as primary or secondary storage, and the like. For example, if the computer-readable media is implemented as semiconductor-based memory, the software disclosed herein can be encoded on the computer-readable media by transforming the physical state of the semiconductor memory. For example, the software can transform the state of transistors, capacitors, or other discrete circuit elements constituting the semiconductor memory. The software also can transform the physical state of such components in order to store data thereupon.

As another example, the computer-readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations also can include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 300 in order to store and execute the software components presented herein. It also should be appreciated that the computer architecture 300 can include other types of computing devices, including hand-held computers, embedded computer systems, personal digital assistants, and other types of computing devices known to those skilled in the art. It is also contemplated that the computer architecture 300 cannot include all of the components shown in FIG. 13, can include other components that are not explicitly shown in FIG. 13, or can utilize an architecture completely different than that shown in FIG. 13.

Figure 14:
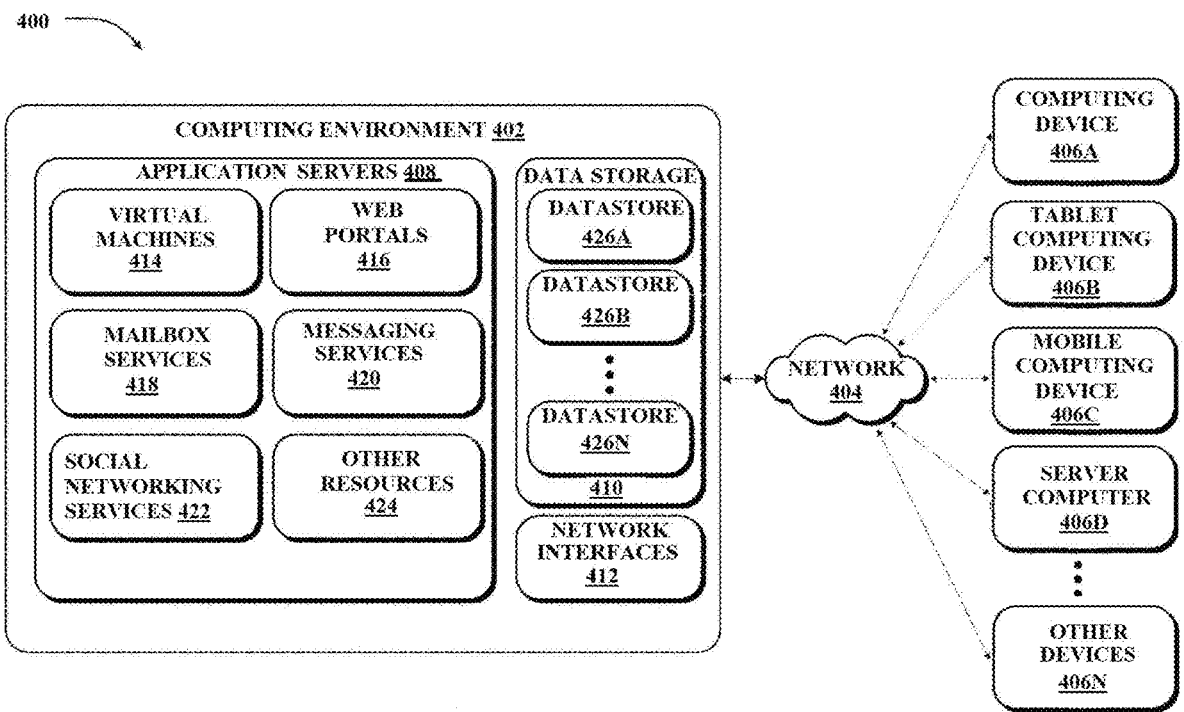
FIG. 14 is a diagram illustrating a computing environment in accordance with the subject disclosure.

Referring now to FIG. 14 with continuing reference to the foregoing figures, an illustrative computing environment, generally designated by the numeral 400, is shown. The operating environment 400 is capable of executing the software components described herein for providing context-aware recommendations of relevant presentation content displayed in mixed environments, among other aspects. Thus, the operating environment 400 illustrated in FIG. 14 can be utilized to execute any aspects of the software components presented herein. For example, the operating environment 400 can be utilized to execute aspects of the techniques disclosed herein.

According to various implementations, the operating environment 400 includes a computing environment 402 operating on, in communication with, or as part of the network 404. The network 404 can be or can include the network 126 shown in FIGS. 10-11. The computing device 124 shown in FIGS. 10-11 can be implemented within the operating environment 400.

The network 404 also can include various access networks. One or more client devices 406A-406N (hereinafter referred to collectively and/or generically as "clients 406") can communicate with the computing environment 402 via the network 404 and/or other connections (not illustrated in FIG. 14). In one illustrated configuration, the clients 406 include a computing device 406A such as a laptop computer, a desktop computer, or other computing device; a slate or tablet computing device ("tablet computing device") 406B; a mobile computing device 406C such as a mobile telephone, a smart phone, or other mobile computing device; a server computer 406D; and/or other devices 406N. It should be understood that any number of clients 406 can communicate with the computing environment 402. It should be understood that the illustrated clients 406 and computing architectures illustrated and described herein are illustrative, and should not be construed as being limited in any way.

In the illustrated configuration, the computing environment 402 includes application servers 408, data storage 410, and one or more network interfaces 412. According to various implementations, the functionality of the application servers 408 can be provided by one or more server computers that are executing as part of, or in communication with, the network 404. The application servers 408 can host various services, virtual machines, portals, and/or other resources. In the illustrated configuration, the application servers 408 host one or more virtual machines 414 for hosting applications or other functionality. According to various implementations, the virtual machines 414 host one or more applications and/or software modules for providing context-aware recommendations of relevant presentation content displayed in mixed environments. It should be understood that this configuration is illustrative, and should not be construed as being limiting in any way. The application servers 408 also host or provide access to one or more portals, link pages, Websites, and/or other information ("Web portals") 416.

According to various implementations, the application servers 408 also include one or more mailbox services 418 and one or more messaging services 420. The mailbox services 418 can include electronic mail ("email") services. The mailbox services 418 also can include various personal information management ("PEM") services including, but not limited to, calendar services, contact management services, collaboration services, and/or other services. The messaging services 420 can include, but are not limited to, instant messaging services, chat services, forum services, and/or other communication services.

The application servers 408 also can include one or more social networking services 422. The social networking services 422 can include various social networking services including, but not limited to, services for sharing or posting status updates, instant messages, links, photos, videos, and/ or other information; services for commenting or displaying interest in articles, products, blogs, or other resources; and/or other services.

The social networking services 422 also can include commenting, blogging, and/or micro blogging services. It should be appreciated that the above lists of services are not exhaustive and that numerous additional and/or alternative social networking services 422 are not mentioned herein for the sake of brevity. As such, the above configurations are illustrative, and should not be construed as being limited in any way. According to various implementations, the social networking services 422 can host one or more applications and/or software modules for providing the functionality described herein for providing context-aware recommendations of relevant presentation content displayed in mixed environments. For instance, any one of the application servers 408 can communicate or facilitate the functionality and features described herein.

As shown in FIG. 14, the application servers 408 also can host other services, applications, portals, and/or other resources ("other resources") 424. The other resources 424 can include, but are not limited to, document sharing, rendering or any other functionality. It thus can be appreciated that the computing environment 402 can provide integration of the concepts and technologies disclosed herein provided herein with various mailbox, messaging, social networking, and/or other services or resources.

As mentioned above, the computing environment 402 can include the data storage 410. According to various implementations, the functionality of the data storage 410 is provided by one or more databases operating on, or in communication with, the network 404. The functionality of the data storage 410 also can be provided by one or more server computers configured to host data for the computing environment 402. The data storage 410 can include, host, or provide one or more real or virtual data stores 426A-426N (hereinafter referred to collectively and/or generically as "data stores 426"). The data stores 426 are configured to host data used or created by the application servers 408 and/or other data. Although not illustrated in FIG. 14, the data stores 426 also can host or store web page documents, word processer documents, presentation documents, data structures, algorithms for execution by a recommendation engine, and/or other data utilized by any application program or another module. Aspects of the data stores 426 can be associated with a service for storing files.

The computing environment 402 can communicate with, or be accessed by, the network interfaces 412. The network interfaces 412 can include various types of network hardware and software for supporting communications between two or more computing devices including, but not limited to, the clients 406 and the application servers 408. It should be appreciated that the network interfaces 412 also can be utilized to connect to other types of networks and/or computer systems.

It should be understood that the operating environment 400 described herein can provide any aspects of the software elements described herein with any number of virtual computing resources and/or other distributed computing functionality that can be configured to execute any aspects of the software components disclosed herein. According to various implementations of the concepts and technologies disclosed herein, the operating environment 400 provides the software functionality described herein as a service to the clients 406. It should be understood that the clients 406 can include real or virtual machines including, but not limited to, server computers, web servers, personal computers, mobile computing devices, smart phones, and/or other devices. As such, various configurations of the concepts and technologies disclosed herein enable any device configured to access the operating environment 400 to utilize the functionality described herein for providing context-aware recommendations of relevant presentation content displayed in mixed environments, among other aspects.

Supported Features and Embodiments

The detailed description provided above in connection with the appended drawings explicitly describes and supports various features of an improved emergency start. By way of illustration and not limitation, supported embodiments include a system for starting an engine electric motor, the system comprising: a battery pack having a battery connection assembly for connecting to the electric motor with at least one lithium-based rechargeable cell therein and associated means for turning the at least one lithium-based rechargeable cell ON or OFF, wherein the battery pack is configured to store a reserve within the at least one lithium-based rechargeable cell that is sufficient to start the engine electric motor, and wherein the battery pack can be activated by the associated means for turning the at least one lithium-based rechargeable cell ON or OFF to access the reserve to start the engine electric motor.

Supported embodiments include the foregoing system, further comprising a receiver for communicating with the associated means for turning the at least one lithium-based rechargeable cell ON or OFF Supported embodiments include any of the foregoing systems, further comprising remote means for communicating with the receiver to instruct the associated means for turning the at least one lithium-based rechargeable cell ON or OFF to activate the battery pack.

Supported embodiments include any of the foregoing systems, wherein the remote means is selected from the group consisting of a computing device, a smartphone, a tablet, and a smartwatch.

Supported embodiments include any of the foregoing systems, wherein the remote means includes a user interface having at least one of a long press, a long tap, and a button to activate the auxiliary battery pack.

Supported embodiments include any of the foregoing systems, wherein the remote means connects with the receiver with short-wavelength ultra-high frequency radio waves having frequencies that fall within the range of about 2.4 GHz to about 2.485 GHz.

Supported embodiments include any of the foregoing systems, further comprising means for visually displaying the status of the connection between the remote means and the receiver.

Supported embodiments include any of the foregoing systems, wherein the remote means communicates with the receiver with radio waves having frequencies that fall within the range of about 400 MHz and about 2100 MHz.

Supported embodiments include any of the foregoing systems, wherein the remote means communicates with the receiver with at least one of a wireless radio frequency signal, a packet oriented mobile data standard network, an EDGE communication protocol, and a high speed packet communication protocol.

Supported embodiments include any of the foregoing systems, wherein the battery connection assembly includes connectors selected from the group consisting of ring terminals and spade connectors.

Supported embodiments include any of the foregoing systems, further comprising a housing for holding the battery pack.

Supported embodiments include a method, an apparatus, and/or means for implementing and/or performing any of the foregoing systems or portions thereof.

Supported embodiments include a method for starting an engine electric motor, the system comprising: configuring a battery pack having at least one lithium-based rechargeable cell therein and associated means for turning the at least one lithium-based rechargeable cell ON or OFF to store a reserve within the at least one lithium-based rechargeable cell that is sufficient to start the engine electric motor, connecting the battery back to the engine electric motor, and activating the battery pack with the associated means for turning the at least one lithium-based rechargeable cell ON or OFF to access the reserve to start the engine electric motor.

Supported embodiments include the foregoing method, further comprising: communicating, through a receiver, with the associated means for turning the at least one lithium-based rechargeable cell ON or OFF to activate the battery pack.

Supported embodiments include any of the foregoing methods, further comprising: connecting a remote means to the receiver, and instructing, through the receiver, the associated means for turning the at least one lithium-based rechargeable cell ON or OFF to activate the battery pack.

Supported embodiments include any of the foregoing methods, wherein the remote means is selected from the group consisting of a computing device, a smartphone, a tablet, and a smartwatch.

Supported embodiments include any of the foregoing methods, wherein the remote means includes a user interface having at least one of a long press, a long tap, and a button to activate the auxiliary battery pack.

Supported embodiments include any of the foregoing methods, further comprising: connecting the remote means to the receiver with short-wavelength ultra-high frequency radio waves having frequencies that fall within the range of about 2.4 GHz to about 2.485 GHz.

Supported embodiments include any of the foregoing methods, further comprising: visually displaying the status of the connection between the remote means and the receiver.

Supported embodiments include any of the foregoing methods, further comprising: communicating with the receiver with radio waves having frequencies that fall within the range of about 400 MHz and about 2100 MHz.

Supported embodiments include any of the foregoing methods, further comprising: communicating with the receiver with at least one of a wireless radio frequency signal, a packet oriented mobile data standard network, an EDGE communication protocol, and a high speed packet communication protocol.

Supported embodiments include a system, an apparatus, and/or means for implementing and/or performing any of the foregoing methods or portions thereof.

Supported embodiments can provide various attendant and/or technical advantages in terms of an improved method and apparatus for providing a charge through a dead or weak battery to an internal combustion engine or electric motor.

Supported embodiments include an improved method and apparatus for providing a charge through a dead or weak battery to an internal combustion engine or electric motor faster and more economically than heretofore has been possible.

The detailed description provided above in connection with the appended drawings is intended as a description of examples and is not intended to represent the only forms in which the present examples can be constructed or utilized.

It is to be understood that the configurations and/or approaches described herein are exemplary in nature, and that the described embodiments, implementations and/or examples are not to be considered in a limiting sense, because numerous variations are possible. The specific processes or methods described herein can represent one or more of any number of processing strategies. As such, various operations illustrated and/or described can be performed in the sequence illustrated and/or described, in other sequences, in parallel, or omitted. Likewise, the order of the above-described processes can be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. A system for starting an engine electric motor, the system comprising:
    a battery pack housing,
    a battery pack having a battery connection assembly for connecting to the electric motor with at least one lithium-based rechargeable cell therein and associated means for turning the at least one lithium-based rechargeable cell ON or OFF,
    wherein the battery connection assembly includes means for turning the at least one lithium-based rechargeable cell OFF when the cell voltage drops to a preselected level to leave the battery pack with sufficient reserve capacity to start the engine electric motor,
    wherein the battery pack can be activated by the associated means for turning the at least one lithium-based rechargeable cell ON or OFF to start the engine electric motor, and
    wherein the battery pack, with the battery connection assembly and the at least one lithium-based rechargeable cell, and the associated means for turning the at least one lithium-based rechargeable cell ON or OFF are positioned within the battery pack housing.

2. The system of claim 1, further comprising a receiver for communicating with the associated means for turning the at least one lithium-based rechargeable cell ON or OFF.

3. The system of claim 2, further comprising remote means for communicating with the receiver to instruct the associated means for turning the at least one lithium-based rechargeable cell ON or OFF to activate the battery pack.

4. The system of claim 3, wherein the remote means is selected from the group consisting of a computing device, a smartphone, a tablet, and a smartwatch.

5. The system of claim 4, wherein the remote means connects with the receiver with short-wavelength ultra-high frequency radio waves having frequencies that fall within the range of about 2.4 GHz to about 2.485 GHz.

6. The system of claim 4, further comprising means for visually displaying the status of the connection between the remote means and the receiver.

7. The system of claim 4, wherein the remote means communicates with the receiver with radio waves having frequencies that fall within the range of about 400 MHz and about 2100 MHz.

8. The system of claim 4, wherein the remote means communicates with the receiver with at least one of a wireless radio frequency signal, a packet oriented mobile data standard network, an EDGE communication protocol, and a high speed packet communication protocol.

9. The system of claim 3, wherein the remote means includes a user interface having at least one of a long press, a long tap, and a button to activate the auxiliary battery pack.

10. The system of claim 1, wherein the battery connection assembly includes connectors selected from the group consisting of ring terminals and spade connectors.

11. A method for starting an engine electric motor, the system comprising:
    providing a battery pack housing having a battery pack with at least one lithium-based rechargeable cell therein and associated means for turning the at least one lithium-based rechargeable cell ON or OFF,
    turning the battery pack OFF when the cell voltage drops to a preselected level to leave the battery pack with sufficient reserve capacity to start the engine electric motor,
    connecting the battery pack to the engine electric motor, and
    activating the battery pack with the associated means for turning the at least one lithium-based rechargeable cell ON or OFF, so that the battery pack can start the engine electric motor and supply power thereto.

12. The method of claim 11, further comprising:
    communicating, through a receiver, with the associated means for turning the at least one lithium-based rechargeable cell ON or OFF to activate the battery pack.

13. The method of claim 11, further comprising:
    connecting a remote means to the receiver, and
    instructing, through the receiver, the associated means for turning the at least one lithium-based rechargeable cell ON or OFF to activate the battery pack.

14. The method of claim 13, wherein the remote means is selected from the group consisting of a computing device, a smartphone, a tablet, and a smartwatch.

15. The method of claim 13, wherein the remote means includes a user interface having at least one of a long press, a long tap, and a button to activate the auxiliary battery pack.

16. The method of claim 14, further comprising:
connecting the remote means to the receiver with short-wavelength ultra-high frequency radio waves having frequencies that fall within the range of about 2.4 GHz to about 2.485 GHz.

17. The method of claim 14, further comprising:
visually displaying the status of the connection between the remote means and the receiver.

18. The method of claim 14, further comprising:
communicating with the receiver with radio waves having frequencies that fall within the range of about 400 MHz and about 2100 MHz.

19. The method of claim 14, further comprising:
communicating with the receiver with at least one of a wireless radio frequency signal, a packet oriented mobile data standard network, an EDGE communication protocol, and a high speed packet communication protocol.

\* \* \* \* \*